(12) United States Patent
Tyler et al.

(10) Patent No.: US 9,856,910 B2
(45) Date of Patent: Jan. 2, 2018

(54) SELF-LUBRICATED THRUST BEARING FOR A HINGED AIRCRAFT WING

(71) Applicant: ROLLER BEARING COMPANY OF AMERICA, INC., Oxford, CT (US)

(72) Inventors: Andy Tyler, Fountain Valley, CA (US); Ryan Peaslee, Cypress, CA (US); Michael Heligman, Irvine, CA (US); David Coombe, Chewton Keynsham (GB); Matthias Duenner, Costa Mesa, CA (US); Philippe Charmillot, Rebeuvelier (CH)

(73) Assignee: Roller Bearing Company of America, Inc., Oxford, CT (US)

( * ) Notice: Subject to any disclaimer, the term of this patent is extended or adjusted under 35 U.S.C. 154(b) by 0 days.

(21) Appl. No.: 15/359,828

(22) Filed: Nov. 23, 2016

(65) Prior Publication Data

US 2017/0152889 A1 Jun. 1, 2017

Related U.S. Application Data

(60) Provisional application No. 62/260,794, filed on Nov. 30, 2015, provisional application No. 62/287,190, filed on Jan. 26, 2016.

(51) Int. Cl.
*F16C 25/04* (2006.01)
*F16C 17/04* (2006.01)
(Continued)

(52) U.S. Cl.
CPC .............. *F16C 25/04* (2013.01); *F16C 17/04* (2013.01); *F16C 27/063* (2013.01); *F16C 33/04* (2013.01);
(Continued)

(58) Field of Classification Search
CPC ......... F16C 25/04; F16C 17/10; F16C 17/105
See application file for complete search history.

(56) References Cited

U.S. PATENT DOCUMENTS 2,270,392 A * 1/1942 Charles ................. F16C 23/045
384/222
3,378,316 A * 4/1968 Hotine .................... F16C 25/04
384/125
(Continued)

FOREIGN PATENT DOCUMENTS

AU 8035782 8/1992
CH CA 2840700 A1 * 1/2013 .......... F16C 11/0614
(Continued)

OTHER PUBLICATIONS

International Search Report issued in corresponding PCT Application No. PCT/EP2011/061013, dated May 2, 2012, pp. 1-4.
(Continued)

*Primary Examiner* — Thomas R Hannon
(74) *Attorney, Agent, or Firm* — Murtha Collina LLP

(57) ABSTRACT

A bearing for a hinge in a hinged raked aircraft wing tip includes an outer member that has a concave inner surface and an inner member that has first and second inner segments. Each of the first and second inner segments has a base that has a bearing section extending therefrom. The bearing sections together form a convex outer surface that is complementary in shape to the concave inner surface. A preload feature is positioned between and engages a portion of the bearing sections. A lubricous liner is positioned between the concave inner surface and the convex outer surface. The bearing sections are positioned in the outer member to compress the preload feature to limit axial movement between the outer and inner members to a predetermined magnitude. The preload feature flexes outward as a result of
(Continued)

wear to the liner to maintain the axial movement to the predetermined magnitude.

10 Claims, 12 Drawing Sheets

(51) Int. Cl.
*F16C 33/04* (2006.01)
*F16C 27/06* (2006.01)
*B64C 3/56* (2006.01)
*F16C 17/10* (2006.01)
*F16C 33/20* (2006.01)

(52) U.S. Cl.
CPC .............. *B64C 3/56* (2013.01); *F16C 17/10* (2013.01); *F16C 33/201* (2013.01); *F16C 2202/52* (2013.01); *F16C 2208/10* (2013.01); *F16C 2208/32* (2013.01); *F16C 2208/70* (2013.01); *F16C 2229/00* (2013.01); *F16C 2326/43* (2013.01)

(56) References Cited

U.S. PATENT DOCUMENTS

| | | | |
|---|---|---|---|
| 3,384,428 A | 5/1968 | Hodge | |
| 3,565,496 A * | 2/1971 | Latussek et al. | F16C 25/04 384/219 |
| 3,600,047 A | 8/1971 | MacDonnell | |
| 3,602,558 A | 8/1971 | Reynolds | |
| 3,716,244 A | 2/1973 | Hellwig | |
| 3,748,001 A | 7/1973 | Neumann et al. | |
| 3,909,087 A | 9/1975 | Cairns | |
| 3,986,752 A | 10/1976 | Bogor et al. | |
| 4,030,787 A | 6/1977 | Brogan et al. | |
| 4,033,647 A | 7/1977 | Beavers | |
| 4,553,858 A | 11/1985 | Neugebauer et al. | |
| 4,554,983 A | 11/1985 | Obrecht | |
| 4,555,033 A | 11/1985 | Miller | |
| 4,596,475 A | 6/1986 | Pannwitz | |
| 4,752,149 A * | 6/1988 | Paeschke | F16C 23/045 403/129 |
| 4,859,148 A | 8/1989 | Hibyan | |
| 4,875,768 A | 10/1989 | Brandenstein et al. | |
| 5,169,245 A | 12/1992 | Harada et al. | |
| 5,381,986 A | 1/1995 | Smith et al. | |
| 5,531,526 A | 7/1996 | Labedan et al. | |
| 5,564,836 A | 10/1996 | Ide et al. | |
| 5,584,585 A | 12/1996 | Premiski et al. | |
| 5,611,628 A | 3/1997 | Brouwer | |
| 6,485,181 B2 | 11/2002 | Reynolds | |
| 6,799,895 B2 | 10/2004 | Reynolds | |
| 2007/0274618 A1 | 11/2007 | Sandin | |
| 2013/0099060 A1 | 4/2013 | Dees et al. | |
| 2014/0117151 A1 | 5/2014 | Fox et al. | |
| 2014/0140646 A1 | 5/2014 | Porter et al. | |
| 2015/0097087 A1 | 4/2015 | Sakurai et al. | |

FOREIGN PATENT DOCUMENTS

| | | | |
|---|---|---|---|
| CN | 105984580 A | 10/2016 | |
| DE | 7521859 | 11/1975 | |
| DE | 3039023 A1 | 4/1982 | |
| DE | 3612949 A1 | 10/1987 | |
| EP | 1645760 A2 | 4/2006 | |
| FR | 975238 | 3/1951 | |
| FR | 2577589 A1 | 8/1986 | |
| GB | 1062976 | 3/1967 | |
| GB | 2424456 A | 9/2006 | |
| JP | S5343151 U | 4/1978 | |
| JP | S58166122 A | 10/1983 | |
| WO | 02057642 A1 | 7/2002 | |
| WO | 03078855 A1 | 9/2003 | |
| WO | 2013000517 A1 | 1/2013 | |
| WO | WO-2015144460 A1 * | 10/2015 | F16C 25/04 |

OTHER PUBLICATIONS

Written Opinion issued in corresponding PCT Application No. PCT/EP2013/057813, dated May 1, 2012, pp. 1-6.
International Preliminary Report on Patentability issued in corresponding PCT Application No. PCT/EP2011/061013, dated Jun. 4, 2013, pp. 1-11.
Written Opinion issued in corresponding PCT Application No. PCT/EP2013/057813, dated Dec. 13, 2013, pp. 1-5.
Written Opinion issued in corresponding PCT Application No. PCT/US2013/068743, dated Jul. 30, 2014, pp. 1-12.
Extended European Search Report issued in corresponding EP Application No. 16201083.9, dated Apr. 21, 2017, pp. 1-5.

* cited by examiner

SELF-LUBRICATED THRUST BEARING FOR A HINGED AIRCRAFT WING

CROSS REFERENCE TO RELATED APPLICATION

This application claims the benefit of U.S. Provisional Patent Application No. 62/260,794 filed on Nov. 30, 2015 and of U.S. Provisional Patent Application No. 62/287,190 filed on Jan. 26, 2016, the contents of each of which are incorporated herein by reference in their entireties.

TECHNICAL FIELD

The present invention is directed to a thrust bearing for a hinged aircraft wing, and more particularly to a thrust bearing having a lubricious liner therein and a preload feature adapted to maintain axial movement within the bearing to a predetermined limit before and after wear of the liner.

BACKGROUND

In the aerospace industry, airframe manufacturers seek methods and devices to maximize fuel efficiency and minimize costs (i.e., increase economy) of various aircraft. One aspect of aerospace design that manufacturers routinely seek to optimize is wing design. With fixed wing aircraft, the longer the wing, the more aircraft lift is attained, thereby increasing efficiency of fuel consumption. However, due to airport gate constraints, there is a limitation on wing length. For example, existing airport designs place limits on aircraft wingspan. Airport designs are based on International Civil Aviation Organization (ICAO) Codes A through F, which establish dimensional limits on wingspan, landing gear width and length. To overcome this, an aircraft wing can be designed to swing back or swing up a section or tip for parking at an airport gate. This is commonly referred to as being a "swept" design or an aircraft with hinged raked wing tip. For example (as shown in FIG. 1) while an aircraft 100 is parked at the gate, the wing section or tip 103 is swung back or up from an operational position to gate parking position wherein the wing tip 103' pivoted up from a base portion 102 of the wing which is secured to the aircraft fuselage 101. After leaving the gate, the wing section or tip 103' is swung forward or down for takeoff, flight, and landing. After landing, the wing section or tip 103' is again swung back or up prior to arriving at the gate.

As is further shown in FIG. 1, hinged raked wing tip aircrafts, such as hinged raked wing tip aircraft 100, employ an actuator (not shown) that is in communication with a hinge 104 between the wing tip 103, 103' and the base portion 102 of the wing. Such hinges 104 use various bearings (e.g., thrust bearings) to facilitate relative motion between the wing tip 103, 103' and the base portion 102 of the wing. However, thrust bearings tend to wear during use and develop excessive axial movement, creating misalignment problems between the wing tip 103 and the base portion 102 of the wing.

There is an unsolved need for a new bearing for a hinge for a raked wing tip aircraft that has little of no axial movement.

SUMMARY

There is disclosed herein a bearing for a hinge for a hinged raked aircraft wing tip. The bearing includes an outer member that has an interior area defined by a concave inner surface. The bearing includes an inner member assembly that has a first inner segment and a second inner segment. The first inner segment has a first base and a first bearing section extending axially from the first base. The second inner segment has a second base and a second bearing section extending axially from the second base. The first bearing section and the second bearing section together form a convex outer surface that is complementary in shape to the concave inner surface. A preload feature (e.g., a spring ring or an elastomeric material) is positioned between and engages a portion of the first bearing section and/or the second bearing section. A lubricous liner is positioned between the concave inner surface and the convex outer surface. At least a portion of the first bearing section and the second bearing section are positioned in the interior area so that the preload feature is compressed radially and/or axially inward and is biased radially and/or axially outward to limit axial movement between the outer member and the inner member assembly to a predetermined magnitude. The preload feature is adapted to flex radially and/or axially outward as a result of wear to the liner to maintain the axial movement to the predetermined magnitude.

In one embodiment, the outer member includes a first outer part and a second outer part secured to the first outer part.

In one embodiment, the first inner segment and the second inner segment are secured to one another.

In one embodiment, the outer member defines a mounting flange extending radially therefrom.

In one embodiment, the mounting flange includes a plurality of bores extending therethrough.

In one embodiment, the bearing includes a spacer ring disposed between first outer part and the second outer part. The spacer ring can be made from an elastomeric material.

In one embodiment, the outer member includes a first outer part and a second outer part, wherein the first outer part is threaded into the second outer part.

There is further disclosed herein a bearing for a hinge for a hinged raked aircraft wing tip. The bearing includes an outer member that has an interior area defined by a concave inner surface. The bearing includes an inner member assembly that has a first inner segment and a second inner segment. The first inner segment has a first base and a first bearing section extending axially from the first base. The second inner segment has a second base and a second bearing section extending axially from the second base. The first bearing section and the second bearing section together form a convex outer surface that is complementary in shape to the concave inner surface. The bearing includes a preload feature formed by a gap (e.g., variable sized gap) between the first inner segment and the second inner segment. A lubricous liner is positioned between the concave inner surface and the convex outer surface. The first inner segment and the second inner segment are resiliently compressed towards one another and are biased elastically outward to limit the axial movement between the outer member and the inner member assembly to a predetermined magnitude. The first inner segment and the second inner segment are adapted to flex outward as a result of wear to the liner to maintain the axial movement to the predetermined magnitude.

DETAILED DESCRIPTION

Figure 1:
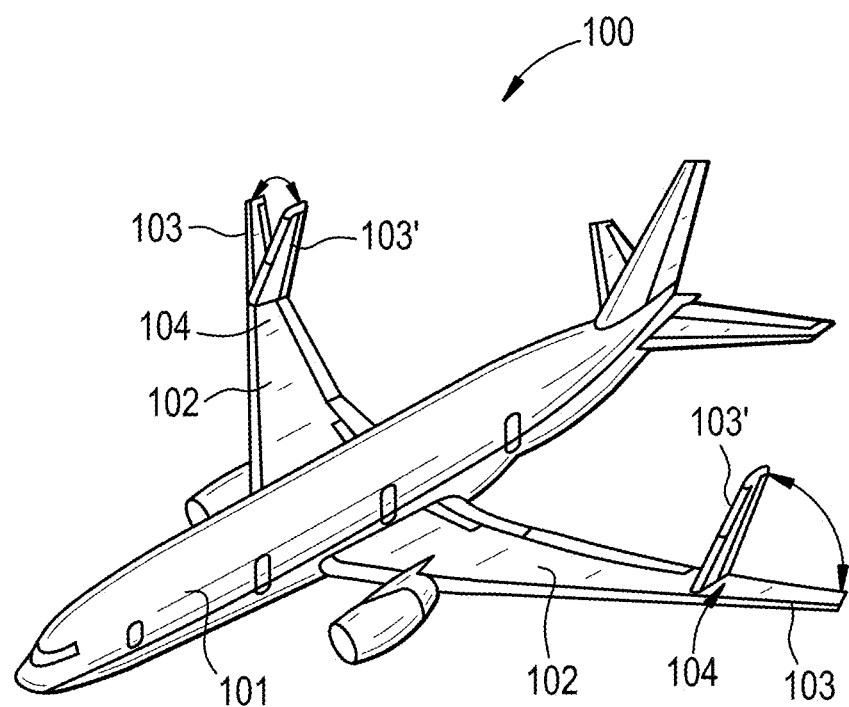
FIG. 1 is a perspective view sketch of a prior art aircraft with hinged raked wing tip.

As shown in FIG. 1, an aircraft suitable for use in conjunction with the disclosures of the present invention is generally indicated by the numeral 100. The aircraft 100 includes a wing 102 secured to a fuselage 101. The wing 102 further includes a hinged aircraft wing tip 103, 103' (hereinafter "the wing tip 103, 103'"). The wing tip 103, 103' is pivotally mounted to the wing 102 via a hinge 104. Thus, element numbers 103 and 103' of FIG. 1 are used to denote minimum and maximum extension and flexion of the wing tip 103, 103', respectively. As used herein, the term "wing tip" 103, 103' refers, generally, to an attachment that is configured to modify lift and/or which would generally be considered to be a wing tip by one skilled in the relevant art.

Figure 2:
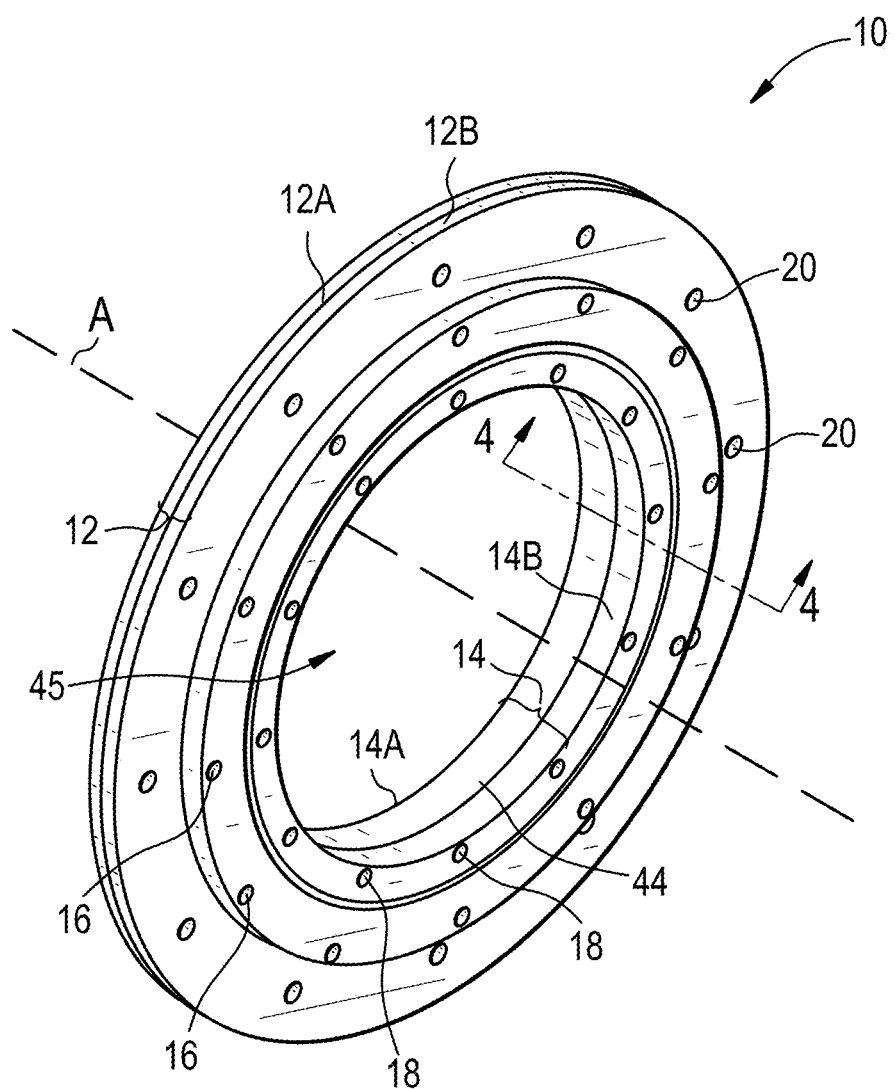
FIG. 2 is a perspective view of one embodiment of a thrust bearing of the present invention.
Figure 3:
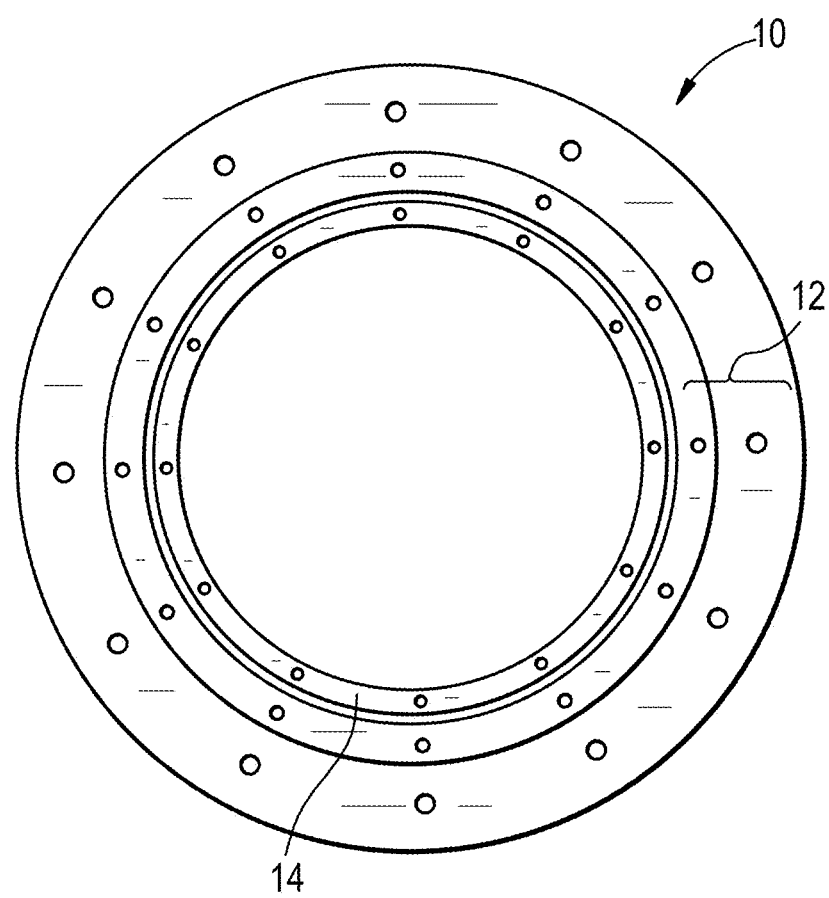
FIG. 3 is a top schematic view of the thrust bearing of FIG. 2.

The hinge 104 includes a bearing 10, such as a thrust bearing 10 similar to that shown in FIG. 2. As can be seen in FIGS. 2-7, the bearing 10 includes an outer member 12, an inner member 14, a lubricious liner 30 (e.g., self-lubricating liner), and a preload feature 50. The outer member 12 includes an interior area defined by a concave inner surface 22 (best seen in FIG. 4). A portion of the inner member 14 is disposed for rotation in the interior area of the outer member 12 concentric with a longitudinal (i.e., axial) axis A, as described herein.

Figure 4:
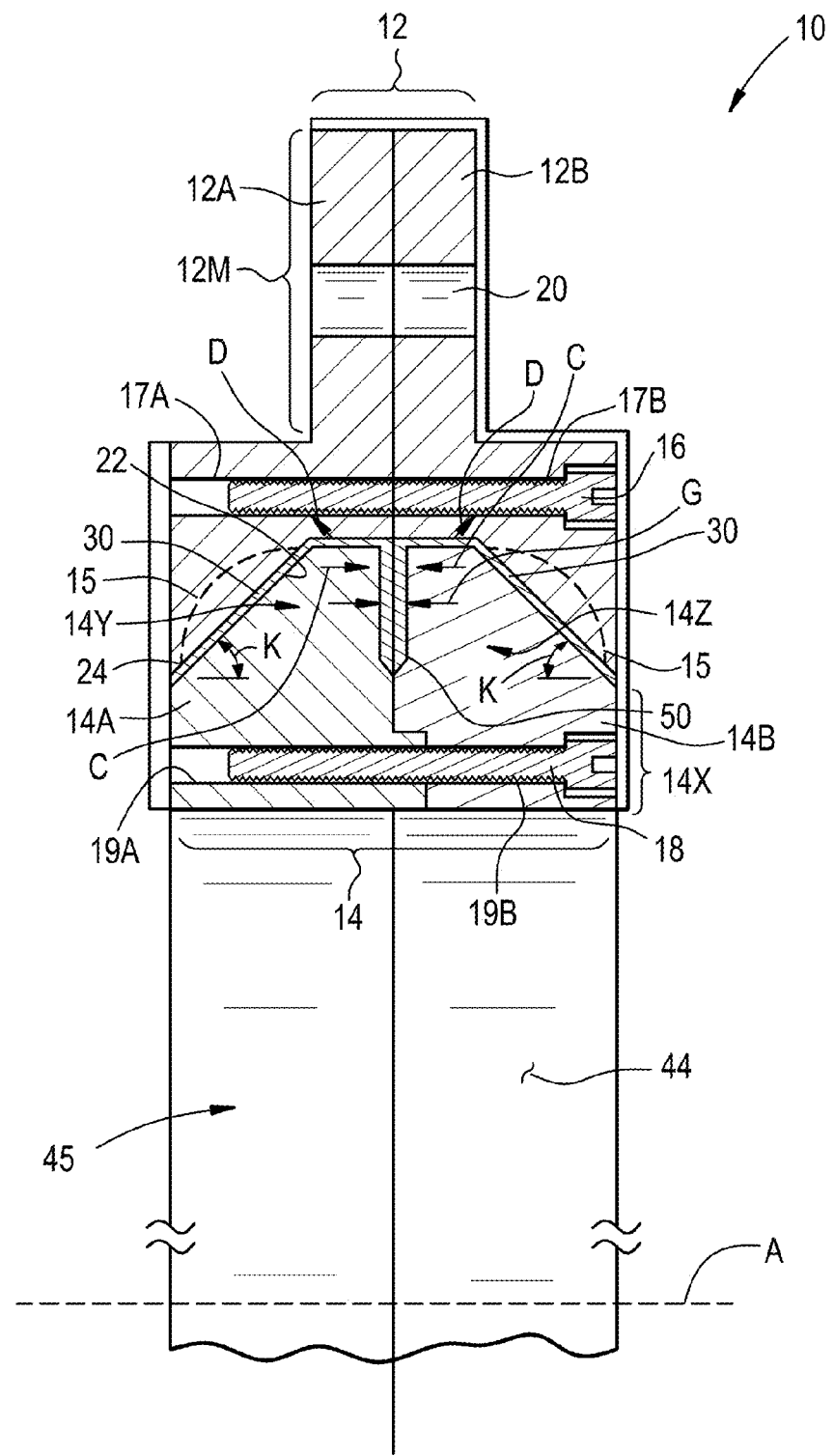
FIG. 4 is a transverse cross sectional view of the bearing of FIG. 2 taken across a line 4-4 of FIG. 2 having a preload feature.

As seen in FIG. 4, the inner member 14 has a base 14X and a bearing section 15 defined by a first inner segment 14Y and a second inner segment 14Z each extending axially from the base 14X. The first inner segment 14Y and the second inner segment 14Z of the bearing section 15 define a convex outer surface 24 that is complementary in shape to the concave inner surface 22 of the outer member 12. The convex outer surface 24 forms an angle K relative to the axis A defining a generally V-shaped cross section.

The lubricious liner 30 is positioned between the convex outer surface 24 of the inner member 14 and the concave inner surface 22 of the outer member 12. In one embodiment, the lubricious liner 30 is secured to the concave inner surface 22 of the outer member 12 and slidingly engages the convex outer surface 24 of the inner member 14. However, the present invention is not limited in this regard as the lubricious liner 30 may be secured to the convex outer surface 24 of the inner member 14 and slidingly engage the concave inner surface 22 of the outer member 12.

As shown in FIG. 4, the preloading feature 50 is positioned in the bearing section 15. In one embodiment, the preload feature 50 is defined by a gap G formed between the first inner segment 14Y and the second inner segment 14Z. In a relaxed state, the gap G is defined by a predetermined spacing between the first inner segment 14Y and the second inner segment 14Z.

A portion of the bearing section 15 is positioned in the interior area so that the preload feature 50 limits axial movement between the outer member 12 and the inner member 14 to a predetermined magnitude. The preload feature 50 is activated (e.g., compressed) by compressing the first inner segment 14Y and the second inner segment 14Z towards one another in the direction of the arrows C as shown in FIG. 4. Compression of the preload feature 50 by compressing the first inner segment 14Y and the second inner segment 14Z towards one another is accomplished by an interference fit between the convex outer surface 24 of the inner member 14 and the concave inner surface 22 of the outer member 12. Thus, the preload feature 50 is biased radially and/or axially outward in the direction of the arrows D, thereby urging the first inner segment 14Y and the second inner segment 14Z away from each other and in engagement with the liner 30. The preload feature 50 of the inner member 14 has pre-load applied to the outer edges thereof, thus creating a load against the liner 30, and thereby compensating for any wear (e.g., liner wear) that may occur over the life of the bearing 10. In one embodiment, when the preload feature 50 is compressed, the gap G is reduced by a predetermined magnitude between the first inner segment 14Y and the second inner segment 14Z. When the bearing 10 is assembled in an initial state before use and before incurring wear, axial movement of the inner member 14 relative to the outer member 12 is limited to a predetermined magnitude of about zero.

The preload feature 50 is adapted to flex radially and/or axially outward as a result of wear to the liner in order to facilitate maintenance of, to precisely maintain, and/or to limit axial movement between the outer member 12 and the inner member 14 to the predetermined magnitude. Thus, the preload feature 50 is adapted to compensate for a predetermined amount of wear of the liner 30. While axial movement between the outer member 12 and the inner member 14 is described herein as being limited, it will be understood by those skilled in the relevant art that other movements such as radial movement are implicitly similarly maintained and/or limited by the preload feature 50.

As shown in FIG. 4, the outer member 12 includes a first outer part 12A and a second outer part 12B. The first outer part 12A and the second outer part 12B are secured to one another by suitable fasteners as described herein. For example, a respective one of a plurality of bolts 16 extends through a respective one of a plurality of bores 17B in the second outer part 12B and is threaded into a respective one of a plurality of threaded bores 17A formed in the first outer part 12A. A bore 19 extends through the first inner part 14A and the second inner part 14B. The first outer part 12A and the second outer part shown in FIG. 4 are generally symmetrical to one another (e.g., mirror images).

Figure 6:
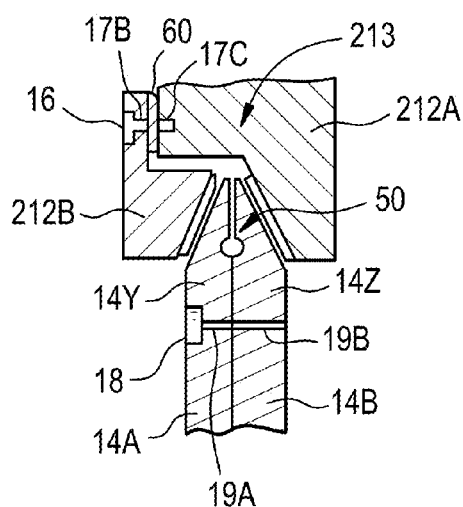
FIG. 6 is an enlarged view of a portion of the cross section of FIG. 4, wherein the pre-load feature is shown in a loaded position.
Figure 7:
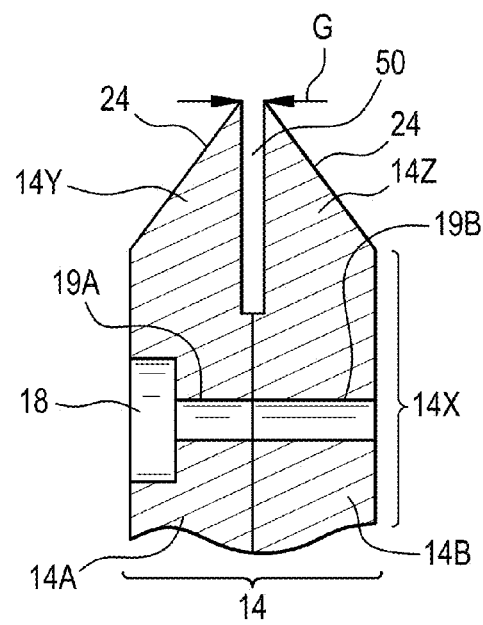
FIG. 7 is an enlarged view of a portion of the cross section of FIG. 4.

While the first outer part 12A and the second outer part 12B are shown and described as being generally symmetrical to one another, the present invention is not limited in this regard as the first outer part 12A and the second outer part 12B may be of different configurations. For example, as shown in FIG. 6, the first outer part 212A is larger than the second outer part 212B and has a lobe 213 axially extending towards the second outer part 212B. In addition, as shown in FIG. 6, a spacer ring 60 is disposed between the first outer part 212A and the second outer part 212B. In one embodiment, the spacer ring 60 is manufactured from an elastomeric material.

Referring back to FIG. 4, the inner member 14 includes a first inner part 14A and a second inner part 14B. The first inner part 14A and the second inner part 14B are secured to one another by suitable fasteners as described herein. For example, a respective one of a plurality of bolts 18 extends through a respective one of a plurality of bores 19B in the second inner part 14B and is threaded into a respective one of a plurality of threaded bores 19A formed in the first inner part 14A. The first inner part 14A and the second inner part 14B shown in FIG. 4 are generally symmetrical to one another (e.g., mirror images). However, the present invention is not limited in this regard as the first inner part 14A and the second inner part 14B may be of different shapes and may be asymmetrical.

In one embodiment, as shown in FIG. 4, the outer member 12 further includes a mounting flange 12M extending radially from the outer member 12. In one embodiment, the mounting flange 12M includes a plurality of bores, each of which extends through the mounting flange 12M. In one embodiment, a plurality of bores 20 extend through the outer member 12. The mounting flange 12M may be secured to the hinge 104, the wing tip 103 or the base portion 102. As shown in FIG. 4, the inner member 12 has an interior area 45 defined by an inner surface 44. The inner surface 44 is adapted to receive a shaft or axle (not shown) that is in communication with hinge 104, the wing tip 103 or the base portion 102.

Figure 5:
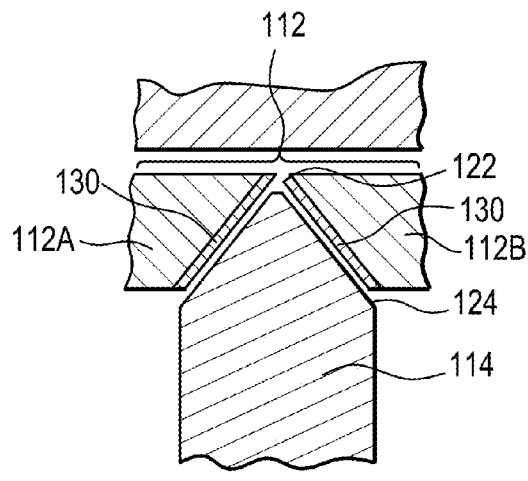
FIG. 5 is an enlarged cross sectional view of an alternative embodiment of the portion of the cross section of FIG. 4, taken across line 4-4.

In one embodiment, as shown in FIG. 5, the inner member 114 is one integral piece and the outer member 112 includes a first outer part 112A and a second outer part 112B secured to one another by suitable fasteners similar to that shown in FIG. 4. In FIG. 5, the preload feature of the inner member 114 is defined by a pre-load force acting upon the outer edges of the inner member and subjecting the liner to compression.

Figure 8:
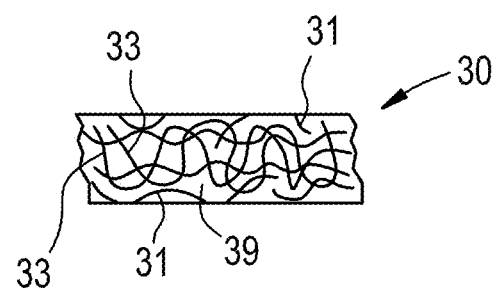
FIG. 8 is a cross sectional view of a liner of FIG. 4 suitable for use in the present invention.

As shown in FIG. 8, the lubricious liner 30 includes a plurality of lubricating fibers 31 in a support system. In one embodiment, the support system defines a plurality of support fibers 33 and a resin 39 infused between the support fibers 33 and the lubricating fibers 31. In one embodiment, the plurality of lubricating fibers 31 are manufactured from a polytetrafluoroethylene (PTFE) material, a nylon, and/or a graphite. In one embodiment, the plurality of support fibers 33 are manufactured from fiberglass, polyethylene terephthalate (sometimes written poly(ethylene terephthalate)), commonly abbreviated PET, PETE (Dacron®)), polyester, cotton, a meta-aramid material (e.g., Nomex®), and/or a para-aramid synthetic material (e.g., Kevlar®). In one embodiment, the resin system includes polyester, epoxy, phenolic, urethane, polyimide and/or polyamide. In one embodiment, the support system includes a filler in a composite resin system including polyester, epoxy, phenolic, urethane, polyimide and/or polyamide. In one embodiment, the filler comprises fiberglass, graphite, bronze, molybdenum disulfide and/or carbon fiber.

Figure 9:
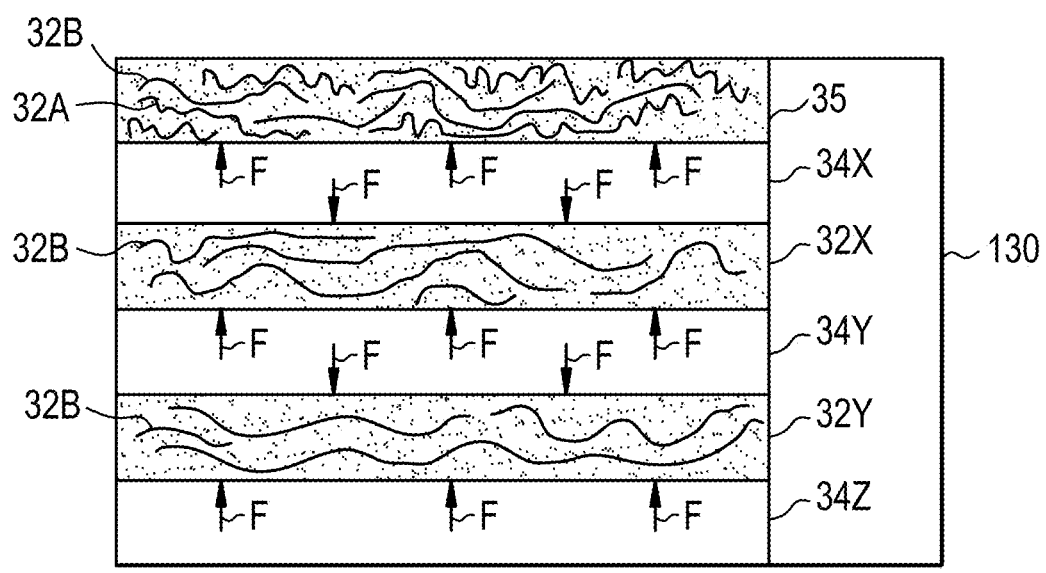
FIG. 9 is a cross sectional view of another embodiment of the liner of FIG. 4 suitable for use in the present invention.

As shown in FIG. 9, another embodiment of a lubricious liner is designated by the numeral 130. The lubricious liner 130 includes a first fiber (e.g., fabric) layer 35, a second fiber (e.g., fabric) layer 32X and a third fiber (e.g., fabric) layer 32Y. The first fiber layer 35 is made from a blend of self-lubricating fibers 32A and support fibers 32B. The second fiber layer 32X and the third fiber layer 32Y are made from support fibers 32B. In one embodiment, the plurality of self-lubricating fibers 32A are polytetrafluoroethylene (PTFE). In one embodiment, the plurality of self-lubricating fibers 32A includes graphite fibers. In one embodiment, the plurality of support fibers 32B are fiberglass fibers, polyethylene terephthalate (Dacron®) fibers, polyester fibers, cotton fibers, meta-aramid (Nomex®) fibers and/or a para-aramid (Kevlar®) fibers. In one embodiment, lubricious liner 30 includes a filler disposed therein, such as but not limited to fiberglass, graphite, bronze, molybdenum disulfide and carbon fiber. In one embodiment, the lubricious liner 30 is comprised of a PTFE matrix and includes the filler disposed therein.

The lubricious liner 130 includes a first matrix layer (i.e., made from a resin system) 34X, a second matrix layer (i.e., made from a resin system) 34Y and a third matrix layer (i.e., made from a resin system) 34Z. In one embodiment, the resin system of the first matrix layer 34X, the second matrix layer 34Y, and the third matrix layer 34Z includes a polyester, an epoxy, a phenolic, a urethane, a polyimide and/or a polyamide.

The first matrix layer 34X is forced into the first fiber layer 35 as indicated by the arrows F so that the first matrix layer 34X encapsulates the first fiber layer 35 and the resin system of the first matrix layer 34X is infused into the first fiber layer 35 between and around the self-lubricating fibers 32A and the support fibers 32B.

The first matrix layer 34X and the second matrix layer 34Y are forced into the second fiber layer 32X as indicated by the arrows F so that the first matrix layer 34X and the second matrix layer 34Y encapsulate the second fiber layer 32X and the resin system of the first matrix layer 34X and the second matrix layer 34Y are infused into the second fiber layer 32X between and around the support fibers 32B.

The second matrix layer 34Y and the third matrix layer 34Z are forced into the third fiber layer 32Y as indicated by the arrows F so that the second matrix layer 34Y and the third matrix layer 34Z encapsulate the third fiber layer 32X and the resin system of the second matrix layer 34Y and the third matrix layer 34Z are infused into the third fiber layer 32Y between and around the support fibers 32B.

In an embodiment illustrated in FIGS. 10-15, the hinge 104 includes a thrust bearing 310 similar to that shown in FIGS. 2-7, therefore similar elements are designated with similar reference numbers preceded by the numeral 3. The bearing 310 includes an outer member 312 surrounding an inner member assembly 314, a lubricious liner 330 (e.g., self-lubricating liner) disposed therebetween. The thrust bearing 310 includes a preload feature 350 positioned in the inner member assembly 314.

The outer member 312 includes an interior area defined by a concave inner surface 322. A portion of the inner member assembly 314 is disposed for rotation in the interior area of the outer member 312 concentric with a longitudinal (i.e., axial) axis A, as described herein.

Figure 12:
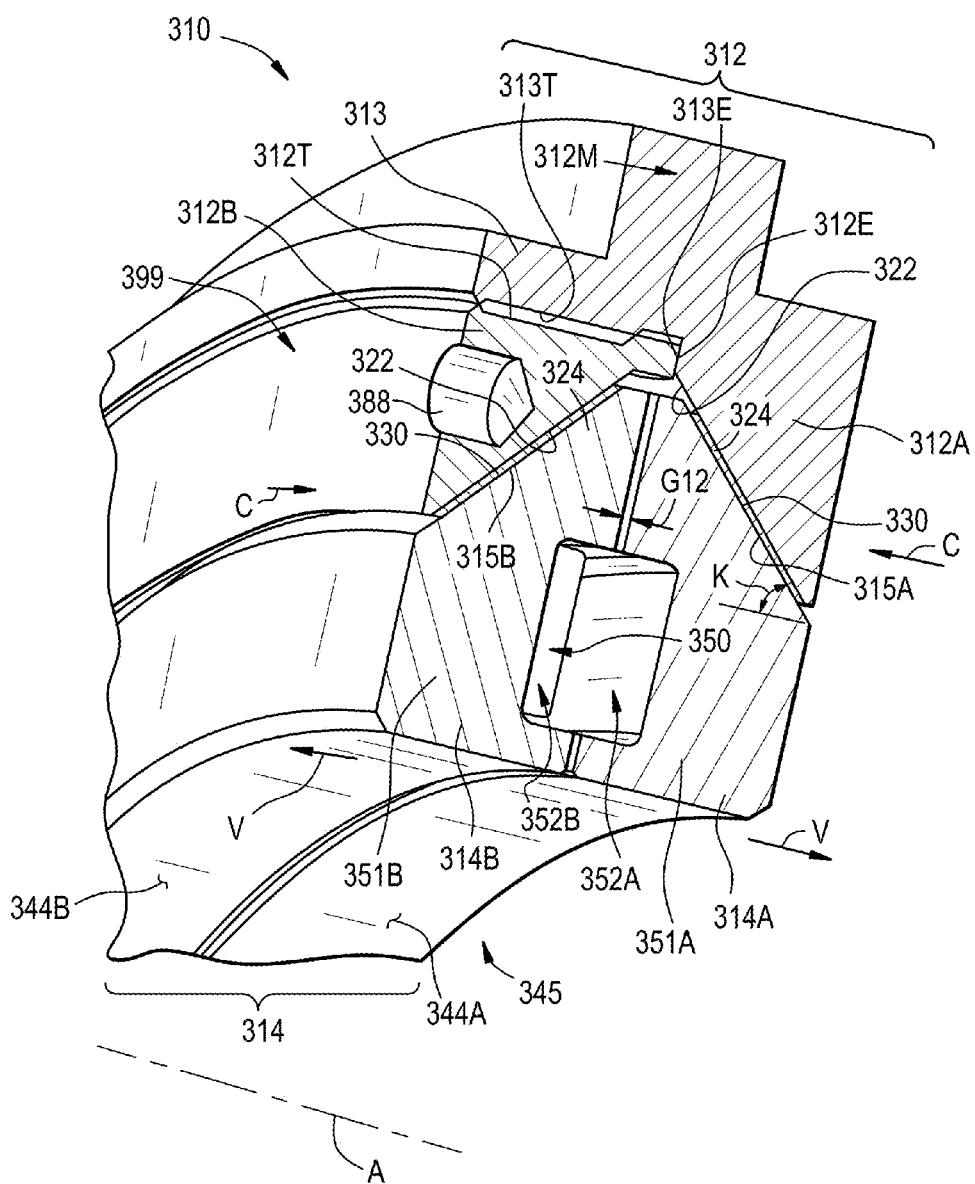
FIG. 12 is an enlarged view of a portion of the thrust bearing of FIG. 11.

As shown in FIG. 12, the inner member assembly 314 includes a first inner segment 314A and a second inner segment 314B that are mirror images of one another. The outer member 312 includes a first outer part 312A and a second outer part 312B. The first outer part 312A is larger than the second outer part 312B and has a lobe 313 axially extending towards and over the second outer part 312B. The first outer part 312A and the second outer part 312B are secured to one another by a threaded engagement that secures the first inner part 314A and the second inner part 314B therebetween, as described herein.

Figure 11:
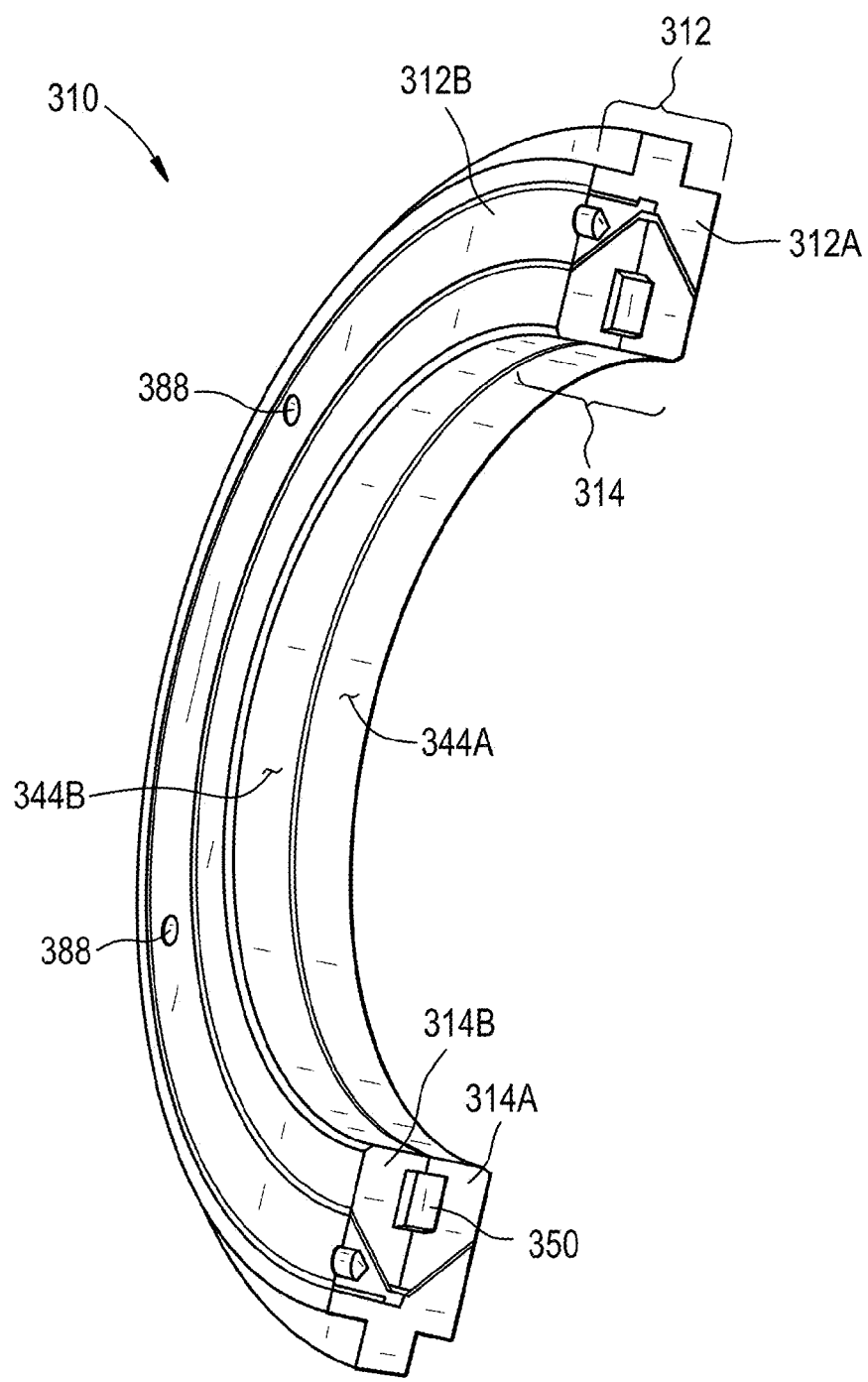
FIG. 11 is a perspective view of a cross section of the thrust bearing of FIG. 10 taken across line 11-11.

As shown in FIG. 12, the outer member 312 further includes a mounting flange 312M extending radially from the outer member 312. The mounting flange 312M may be secured to the hinge 104, the wing tip 103 or the base portion 102. As shown in FIGS. 11-12, the first inner member 312A has an inner surface 344A; and the second inner member 312B has an inner surface 344B. The inner surfaces 344A and 344B define a bore 345 that is adapted to receive a shaft or axle (not shown) that is in communication with the hinge 104, the wing tip 103 or the base portion 102.

The first inner segment 314A has a base 351A extending radially outwardly from the inner surface 344A; and the second inner segment 314B has a base 351B extending radially outwardly from the inner surface 344B. The first inner segment 314A has a tapered bearing section 315A extending axially inwardly and radially outwardly from the base 351A; and second inner segment 314B has a tapered bearing section 315B extending axially inwardly and radially outwardly from the base 351B. The preload feature 350 is positioned between and engages at least a portion of the first bearing section 315A and the second bearing section 315B.

The tapered bearing sections 315A and 315B are spaced apart from one another by a gap G12 and together form a convex outer surface 324 of the inner member 314 that is complementary in shape to the concave inner surface 322. The convex outer surface 324 defines an angle K relative to a line parallel to the axis A.

As shown in FIG. 12, the first inner part 314A has a first C-shaped cavity 352A formed therein and opening axially inwardly towards the second inner part 314B; and the second inner part 314B has a second C-shaped cavity 352B formed therein and opening axially inwardly towards the first inner part 314A. The preload feature 350, for example a spring washer, is compressed between in the first and second C-shaped cavities 352A and 352B between the first inner part 314A and the second inner part 314B, thereby urging the first inner part 314A and the second inner part 314B axially away from one another in the direction of the arrows V.

Referring to FIG. 12, the lobe 313 on the first outer part 312A has a female threaded area 313T formed on a radially inward facing surface thereof. The second outer part 312B has a male threaded area 312T formed on a radially outward surface thereof. The second outer part 312B is threaded into the first outer part 312A thereby securing the first outer part 312A to the second outer part 312B. The first outer part 312A includes a shoulder 313E extending radially inward from the lobe 313. The second outer part 312A includes an abutment edge 312E that abuts the shoulder 313E when the first outer part 312A is fully threaded into the second outer part 312B to prevent axial movement therebetween.

As shown in FIG. 11, the second outer part 312B of the outer member 312 has a plurality of holes 388 in an axial face thereof for receiving a tool (e.g., spanner wrench, not shown) to facilitate installation and torquing the second outer part 312B into the first outer part 312A and subsequent disassembly operations. In one embodiment, the threaded areas 312T and 313T have a thread locking fluid applied thereto to prevent unintentional unthreading of the second outer part 312B from the first outer part 312A. In one embodiment, the first outer part 312A and the second outer part 312B are secured to one another with an anti-rotation device 399 (FIG. 12), such as a pin or a staking.

As shown in FIG. 12, the first outer part 312A has a radially inwardly facing tapered surface; and the second outer part 312B has a radially inwardly tapered surface that together define the concave inner surface 322 that defines an angle K relative to a line parallel to the axis A.

A lubricious liner 330 is positioned between the convex outer surface 324 of the inner member assembly 314 and the concave inner surface 322 of the outer member 312. In one embodiment, the lubricious liner 330 is secured to the concave inner surface 322 of the outer member 312 and slidingly engages the convex outer surface 324 of the inner member 314. However, the present invention is not limited in this regard as the lubricious liner 330 may be secured to the convex outer surface 324 of the inner member 314 and slidingly engage the concave inner surface 322 of the outer member 312. In one embodiment, the lubricious liner 330 is configured the same as the liner 30 shown and described with reference to FIG. 8. In one embodiment, the lubricious liner 330 is configured the same as the liner 130 shown and described with reference to FIG. 9.

The preload feature 350 limits axial movement between the outer member 312 and the inner member 314 to a predetermined magnitude, for example no axial movement. At least a portion of the first bearing section 315A and the second bearing section 315B are positioned in the interior area defined by a concave inner surface 322 so that the preload feature 350 is compressed at least one of radially and axially inward and is biased at least one of radially and axially outward to limit axial movement between the outer member 312 and the inner member assembly 314 to a predetermined magnitude. The preload feature 350 is adapted to flex at least one of radially and axially outward as a result of wear to the liner 330 to maintain the axial movement to the predetermined magnitude.

The preload feature 350 is activated (e.g., compressed) by compressing the first inner part 314A and the second inner part 314B towards one another in the direction of the arrows C as shown in FIG. 12. Compression of the preload feature 350 by compressing the first inner part 314A and the second inner part 314B towards one another is accomplished by threading the second outer part 312B into the first outer part 312A, as described herein. Thus, the preload feature 350 is biased axially outward in the direction of the arrows V thereby urging the first inner part 312A and the second inner part 312B away from each other and in engagement with the liner 330. The preload feature 350 of the inner member 314 creates a load against the liner 330, and thereby compensating for any wear (e.g., liner wear) that may occur over the life of the bearing 310. In one embodiment, when the preload feature 350 is compressed, the gap G12 is increased by a predetermined magnitude. When the bearing 310 is assembled in an initial state before use and before incurring wear, axial movement of the inner member 314 relative to the outer member 312 is limited to a predetermined magnitude of about zero.

The preload feature 350 is adapted to flex axially and/or radially outward as a result of wear to the liner 330 in order to facilitate maintenance of, to precisely maintain, and/or to limit axial movement between the outer member 312 and the inner member 314 to the predetermined magnitude. Thus, the preload feature 350 is adapted to compensate for a predetermined amount of wear of the liner 330. While axial movement between the outer member 312 and the inner member 314 is described herein as being limited, it will be understood by those skilled in the relevant art that other movements such as radial movement are implicitly similarly maintained and/or limited by the preload feature 350.

Figure 10:
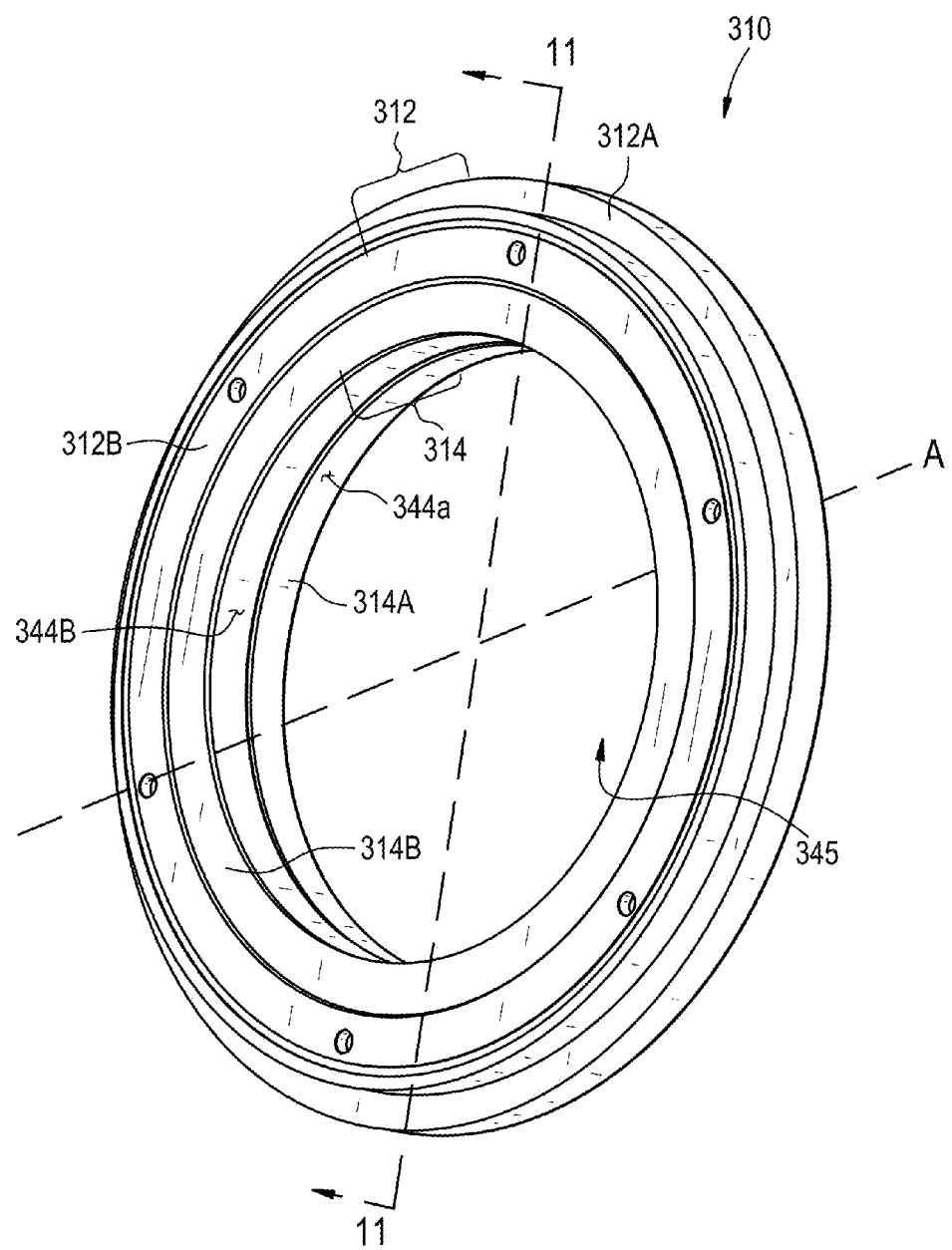
FIG. 10 is a perspective view of another embodiment of the thrust bearing of the present invention.
Figure 13:
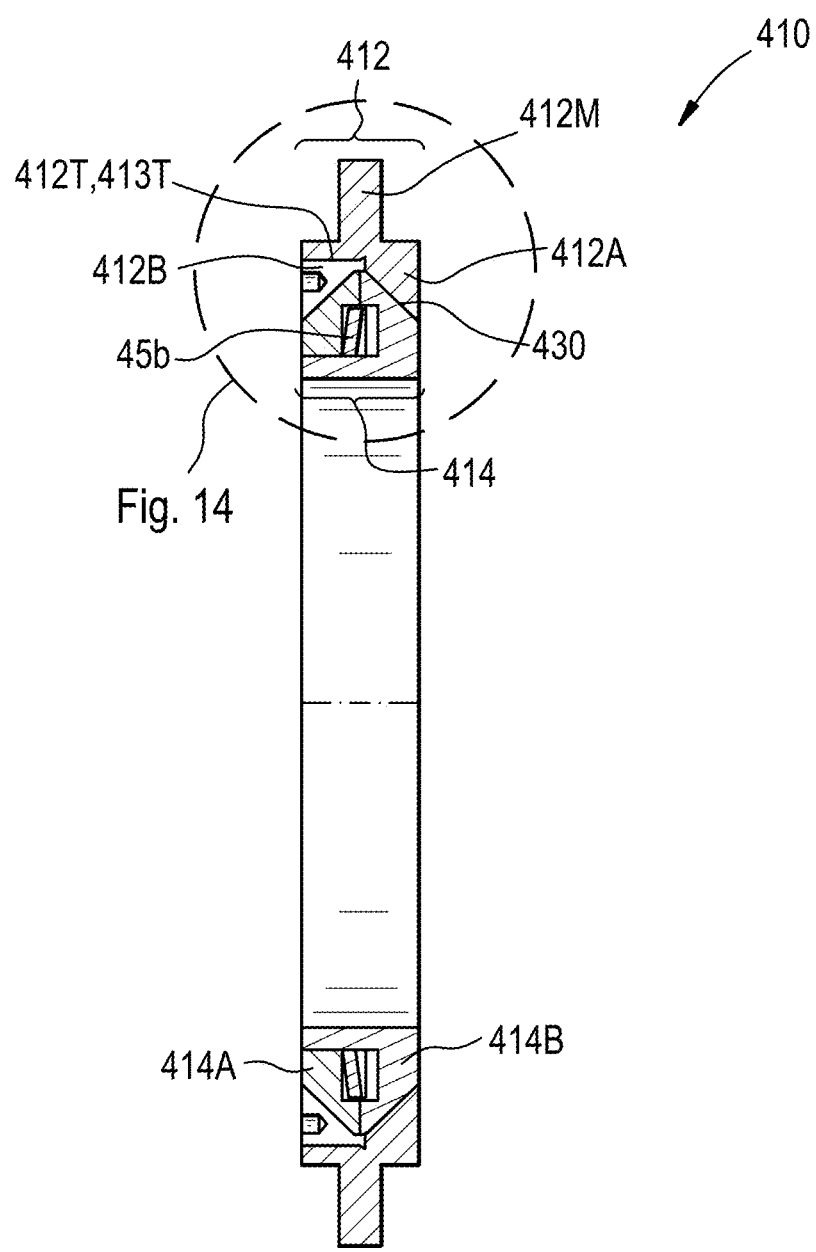
FIG. 13 is a cross sectional view another embodiment of the thrust bearing of FIG. 11.
Figure 14:
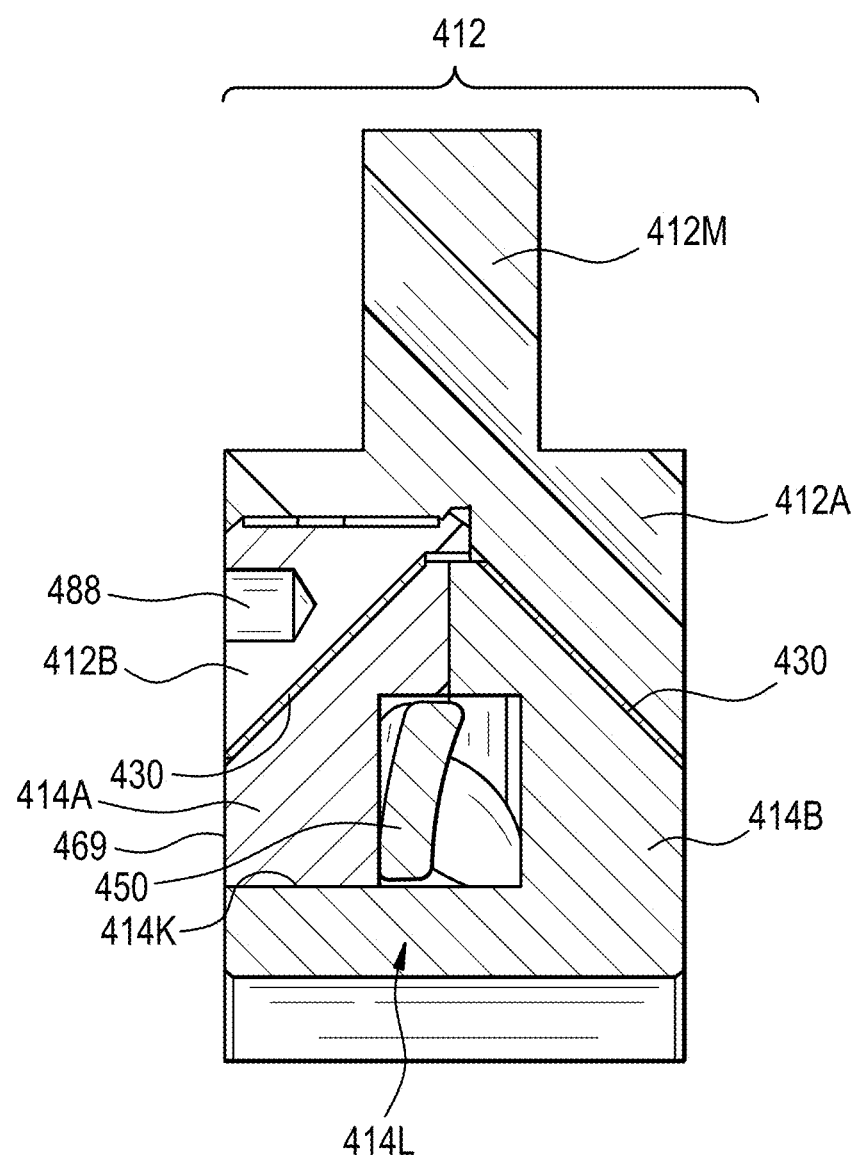
FIG. 14 is an enlarged view if detail 14-14 of FIG. 13.

The thrust bearing 410 of FIGS. 13 and 14 is similar to the thrust bearing 310 of FIGS. 10-12. Therefore, similar elements are designated with similar element numbers replacing the first digit 3 with the numeral 4. The notable difference between the thrust bearing 310 and the thrust bearing 410 is that the first inner part 414A and the second inner part 414B are not mirror images of one another. Instead, the second inner part 414B has an axially extending leg 414L that extends to an axial end face 469 of the first inner part 414A. Thus, the first inner part 414A is seated on a radially outwardly facing surface 414K of the leg 414L. The preload feature 450 is seated on the radially outwardly facing surface 414K of the leg 414L and is compressed between the first inner part 414A and the second inner part 414B, similar to that described herein with reference to the thrust bearing 310 illustrated in FIGS. 10-12.

Figure 15:
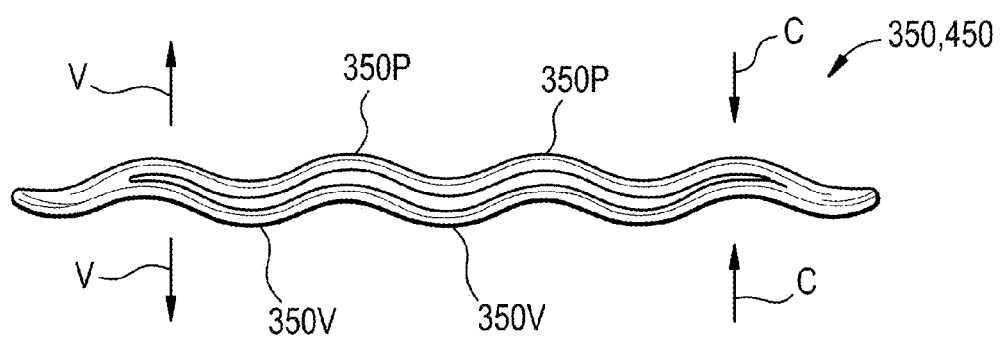
FIG. 15 is a perspective view of an elastic washer employed as a preload feature in the thrust bearing of FIGS. 10-14.

As shown in FIG. 15, the preload feature 350, 450 is a spring washer with a plurality of axially extending peaks 350P and valleys 350V. The preload feature 350, 450 is compressed in the direction of the arrows C to establish an initial preload to urge the first inner part 312A, 412A and the second inner part 314A, 414B away from each other in the direction of the arrows V. The preload feature 350, 450, is manufactured from a resilient material such as but not limited to an elastic material and spring steel.

There is also disclosed herein a method for maintaining a predetermined limit of axial movement between the outer member 12, 312 and the inner member 14, 314 of the bearing 10. The method includes providing the outer member 12, 312 and the inner member 14, 314 having the preload feature 50, 350 therein. The lubricious liner 30, 330 is also provided. The inner member 14, 314 is positioned at least partially in the outer member 12, 312 and the liner 30, 330 is positioned between inner member 14, 314 and the outer member 12,312. The preload feature 50, 350 is compressed so that wear of the liner 30, 330 is compensated for by expansion of the preload feature 50, 350 to maintain axial movement between the inner member 14, 314 and the outer member 12, 312 to a predetermined limit before and after wear of the liner 30, 330.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of the appended claims.

What is claimed is:

1. A bearing for a hinge in a hinged raked aircraft wing tip, the bearing comprising:
an outer member having an interior area defined by a concave inner surface;
an inner member assembly having a first inner segment and a second inner segment,
the first inner segment having a first base and a first bearing section extending axially from the first base,
the second inner segment having a second base and a second bearing section extending axially from the second base, and
the first bearing section and the second bearing section together forming a convex outer surface that is complementary in shape to the concave inner surface;
a preload feature positioned between and engaging at least a portion of the first bearing section and the second bearing section;
a lubricous liner positioned between the concave inner surface and the convex outer surface;
at least a portion of the first bearing section and the second bearing section are positioned in the interior area so that the preload feature is compressed at least one of radially and axially inward and is biased at least one of radially and axially outward to limit axial movement between the outer member and the inner member assembly to a predetermined magnitude; and
the preload feature is adapted to flex at least one of radially and axially outward as a result of wear to the liner to maintain the axial movement to the predetermined magnitude.

2. The bearing of claim 1, wherein the outer member comprises a first outer part and a second outer part secured to one another.

3. The bearing of claim 2, further comprising a spacer ring disposed between first outer part and the second outer part.

4. The bearing of claim 3, wherein the spacer ring comprises an elastomeric material.

5. The bearing of claim 1, wherein the first inner segment and the second inner segment are secured to one another.

6. The bearing of claim 1, wherein the outer member defines a mounting flange extending radially therefrom.

7. The bearing of claim 6, wherein the mounting flange comprises a plurality of bores extending therethrough.

8. The bearing of claim 1, wherein the outer member comprises a first outer part and a second outer part and wherein the second outer part is threaded into the first outer part.

9. The bearing of claim 1, wherein the preload feature comprises a spring ring.

10. A bearing for a hinge in a hinged raked aircraft wing tip, the bearing comprising:
an outer member having an interior area defined by a concave inner surface;
an inner member assembly having a first inner segment and a second inner segment,
the first inner segment having a first base and a first bearing section extending axially from the first base,
the second inner segment having a second base and a second bearing section extending axially from the second base, and
the first bearing section and the second bearing section together forming a convex outer surface that is complementary in shape to the concave inner surface;
a preload feature comprising a gap between the first inner segment and the second inner segment;
a lubricous liner positioned between the concave inner surface and the convex outer surface;
the first inner segment and the second inner segment are resiliently compressed towards one another and are biased elastically outward to limit the axial movement between the outer member and the inner member assembly to a predetermined magnitude; and the first inner segment and the second inner segment are adapted to flex outward as a result of wear to the liner to maintain the axial movement to the predetermined magnitude.

* * * * *